United States Patent [19]
Hatakoshi et al.

[11] Patent Number: 5,978,139
[45] Date of Patent: Nov. 2, 1999

[54] DIFFRACTION GRATING LENS AND OPTICAL DISK RECORDING/REPRODUCING APPARATUS USING THE SAME

[75] Inventors: Genichi Hatakoshi, Yokohama; Masahiro Yamamoto, Sagamihara, both of Japan

[73] Assignee: Kabushiki Kaisha Toshiba, Kawasaki, Japan

[21] Appl. No.: 08/932,909

[22] Filed: Sep. 17, 1997

[30] Foreign Application Priority Data

Sep. 17, 1996 [JP] Japan .................................. 8-245053

[51] Int. Cl.⁶ .............................. G02B 5/18; G02B 5/32; G02B 27/44; G11B 7/135
[52] U.S. Cl. .......................... 359/565; 359/571; 359/575; 359/19; 369/44.23; 369/112
[58] Field of Search .................................. 359/19, 15, 16, 359/566, 569, 571, 575, 565; 369/44.23, 112

[56] References Cited

U.S. PATENT DOCUMENTS

| | | | |
|---|---|---|---|
| 4,733,943 | 3/1988 | Suzuki et al. | 359/569 |
| 5,122,903 | 6/1992 | Aoyama et al. | 359/569 |
| 5,422,870 | 6/1995 | Kojima et al. | 369/44.23 |
| 5,583,843 | 12/1996 | Horinouchi | 369/112 |
| 5,764,343 | 6/1998 | Tanaka | 356/3.03 |
| 5,910,940 | 6/1999 | Guerra | 369/112 |

FOREIGN PATENT DOCUMENTS 7-93797  4/1995  Japan .

OTHER PUBLICATIONS

Appl. Phys. Lett. 65, No. 4 (1994) pp. 388–390, B.D. Terris, et al. "Near–field Optical Data Storage Using a Solid Immersion Lens."

*Primary Examiner*—Jon Henry
*Attorney, Agent, or Firm*—Oblon, Spivak, McClelland, Maier & Neustadt, P.C.

[57] ABSTRACT

The invention provides a diffraction grating lens suitable for use as an objective lens for an optical disk recording/reproducing apparatus. This lens includes a light transmissive substrate of which a refractive index is larger than 1, having one plane and the other plane, and a diffraction grating pattern having a lens effect and constituted by a plurality of diffraction gratings formed on one plane of the light transmissive substrate. The diffraction grating pattern is for focusing an incident light beam flux at a focal point provided on a side of the other plane of the light transmissive substrate and is formed so that a numerical aperture, calculated with the focal point as a peak point, becomes larger than 1.

24 Claims, 6 Drawing Sheets

DIFFRACTION GRATING LENS AND OPTICAL DISK RECORDING/ REPRODUCING APPARATUS USING THE SAME

BACKGROUND OF THE INVENTION

The present invention relates to a diffraction grating lens for focusing a laser beam or the like to a minimum spot, and relates more particularly to a diffraction grating lens suitable for an objective lens of an optical disk recording/ reproducing apparatus and an optical recording/reproducing apparatus using the diffraction grating lens.

Recently, a high-density information recording has been required for a video disk, a read-only optical disk such as a CD, and a recordable and reproducible optical disk of additional recording type or of rewritable type. For this purpose, it has become necessary to provide a light source and an optical system which can be applied for an optical disk recording/reproducing apparatus and which can focus a laser beam for recording and reproducing to a minimum spot.

In general, a diffraction limit spot diameter s of a light focused by a lens having a numerical aperture NA for a light source having a wavelength $\lambda$ is given by the following expression.

$$s = c \cdot \lambda / NA \quad (1)$$

In this case, c takes a value of 0.67 when a diameter is selected to take the intensity of $1/e^2$, for example, in the Gaussian distribution. Since the numerical aperture of the lens in general is not larger than 1 even as a maximum, s can not be made smaller than $c\lambda$ as is clear from the above expression.

An effective method of obtaining a minimum spot is to shorten the wavelength $\lambda$ of the light source. However, when a compact semiconductor laser is used as a light source, there is a limit to the shortening of the wavelength. Further, when the wavelength becomes shorter than the ultraviolet zone, the conventional optical systems can not be used from the limit of the transparent zone of lens materials.

As a method for exceeding the limit shown by the above-described expression (1), a solid immersion lens (SIL) has been proposed (such as, for example, by B. D. Terris et al,: Appl. Phys. Lett., 65 (1994) p. 388). This SIL is designed to focus an incident light beam in this lens.

When an incident light beam is focused in the SIL, the focusing spot diameter can be made smaller than that obtained when incident light beam is focused in the air. This is because when an incident light beam is focused in a medium of which refractive index n is larger than 1, the numerical aperture NA can be made larger than 1.

In an optical system using an SIL, a part of the light beam emitted from this SIL becomes what is called an evanescent light-wave. The evanescent light-wave is a light-wave which exists as a localized wave without propagational property. Since this evanescent light-wave is attenuated rapidly, an object such as an optical disk must be kept in the vicinity of the light emitting plane of the SIL in order to utilize the minimum spot obtained by the SIL.

However, an apparatus of this type has the following problems. First, since the SIL has a large curvature, a lens of non-aberration is necessary, of which preparation is extremely difficult. Second, since the lens becomes necessarily thick, it is difficult to make this lens compact or match position with other parts.

As a lens which utilizes the evanescent beam, there is one as disclosed in the Japanese Patent Application KOKAI Publication No. 7-93797.

According to the technique disclosed in this publication, a grating lens is used as a mean for forming a focusing spot. This grating lens utilizes a diffraction grating group formed in an equivalent distance concentric shape of the distance shorter than that of a light wavelength and generates an evanescent light-wave near the center of this diffraction grating group.

When this grating lens is used as an objective lens of an optical disk recording and reproducing apparatus, a plane on which the diffraction grating group is formed is faced with the surface of an optical disk in a state of being almost in contact with the surface of this optical disk. In other words, unlike the SIL, this grating lens does not generate an evanescent light beam by focusing an incident light beam in the lens but generates an evanescent light beam within the diffraction grating.

However, according to the above-described grating lens, since it should be used by keeping the surface on which the diffraction grating is formed to be almost in contact with the optical disk, there arises a problem in the protection of the diffraction grating pattern. Moreover, since the evanescent light-waves are generated by the whole of the diffraction grating according to this grating lens, there is a possibility that these light-waves reduce the SIN ratio. Further, there is another problem that the optical spot diameter does not necessarily become the so-called minimum spot diameter.

BRIEF SUMMARY OF THE INVENTION

It is an object of the present invention to provide a diffraction grating lens for focusing an incident light beam in the lens and emitting a light-wave including an evanescent light-wave and the lens of which spot diameter can be minimized without a necessity of shortening the wavelength of a light source and which can be made compact and can be easily integrated with other parts.

It is another object of the present invention to provide an optical disk recording/reproducing apparatus which can carry out a high-density recording and reproducing by using the above-described lens.

It is still another object of the present invention to provide an optical disk recording/reproducing apparatus which can achieve a tracking and focusing control in a simple structure by using the abovedescribed lens.

In order to achieve the above-described objects, according to a first aspect of the present invention, there is provided a diffraction grating lens, comprising: a light transmissive substrate with a refractive index larger than 1, having one plane and the other plane; and a diffraction grating pattern having a lens effect and constituted by a plurality of diffraction gratings formed on one plane of the light transmissive substrate, wherein the diffraction grating pattern is for focusing an incident light beam flux at a focal point provided on a side of the other plane of the light transmissive substrate and is formed so that a numerical aperture, calculated with the focal point as a peak point, becomes larger than 1.

It is preferable that the plurality of diffraction gratings of the diffraction grating pattern are formed in a non-uniform period concentric shape.

Further, it is also preferable that there is provided an area where a diffraction grating is not formed at the center of the diffraction grating pattern. In this case, it is further desirable that the diffraction gratings are formed in only the area where the light beams diffracted by the diffraction gratings are totally reflected on the other plane of the substrate.

The diffraction grating pattern may also have a plurality of diffraction grating patterns having different focal points.

Further, the diffraction grating pattern may also have its phase periodically modulated so as to have a plurality of different focal points.

According to the above-described structure, a diffraction grating pattern is formed on the light transmissive substrate and an incident light beam flux is focused within this light transmissive substrate so that the numerical aperture of the lens is made larger than 1. Therefore, it is possible to obtain a minimum focusing spot without shortening the wavelength of the incident light beam. Further, since the lens can be structured in plane, the lens can be made compact easily as well.

According to a second aspect of the present invention, there is provided a diffraction grating lens, comprising: a light transmissive substrate with a refractive index larger than 1, having one plane and the other plane; and first and second diffraction grating patterns each having a lens effect and each constituted by a plurality of diffraction gratings formed on one plane of the light transmissive substrate, wherein the first diffraction grating pattern is for focusing an incident light beam flux at a focal point provided on a side of the other plane of the light transmissive substrate and is formed so that a numerical aperture, calculated with the focal point as a peak point, becomes larger than 1, and the second diffraction grating pattern is provided on a part of the first grating pattern and has a lens action different from that of the first diffraction grating pattern.

According to the above-described structure, a minimum spot can be obtained in a compact structure in a manner similar to that of the first aspect of the present invention. In addition, a plurality of lens actions can be obtained with one lens.

The diffraction gratings of the second diffraction grating pattern may also be formed in an oval shape so that a light beam focused through the second diffraction grating pattern and irradiated to and reflected from an object has an astigmatism.

With the above-described structure, it is possible to carry out a tracking and focusing control at the time of recording into or reproducing from an optical disk, for example, by using a light beam reflected through the second diffraction grating pattern.

According to a third aspect of the present invention, there is provided a diffraction grating lens, comprising: a light transmissive substrate with a refractive index larger than 1, having one plane and the other plane; and a plurality of diffraction grating patterns each having a lens effect and each constituted by a plurality of diffraction gratings formed on one plane of the light transmissive substrate, wherein each diffraction grating pattern is for focusing an incident light beam flux at a focal point provided at a different position from the other position on a side of the other plane of the light transmissive substrate and is formed so that a numerical aperture, calculated with the focal point as a peak point, becomes larger than 1.

According to the above-described structure, a plurality of minimum spots can be obtained with one lens.

The plurality of diffraction grating patterns may be provided to be mutually adjacent with each other or mutually superposed. In any case, the lens can be highly integrated easily.

According to a fourth aspect of the present invention, there is provided an optical disk recording/reproducing apparatus, having an objective lens disposed to face an optical disk, for carrying out a recording and reproducing of information by irradiating a light beam to the optical disk through the objective lens and detecting a light reflected from the optical disk, the objective lens comprising: a light transmissive substrate with a refractive index larger than 1, having one plane and the other plane; and a diffraction grating pattern having a lens effect and constituted by a plurality of diffraction gratings formed on one plane of the light transmissive substrate, wherein the diffraction grating pattern is for focusing an incident light beam flux at a focal point provided on a side of the other plane of the light transmissive substrate and is formed so that a numerical aperture, calculated with the focal point as a peak point, becomes larger than 1.

It is desirable that a diffraction grating pattern having a different lens effect is formed on a part of the diffraction grating pattern and that the diffraction grating pattern having this different lens effect is used for detecting the focus for drive controlling this objective lens.

In this case, the diffraction grating pattern having the different lens effect may also be formed in an oval shape so that a light beam irradiated to and reflected from a disk through this diffraction grating pattern has an astigmatism.

Further, in the disk recording/reproducing apparatus of the fourth aspect, the diffraction grating pattern may also be constituted by a plurality of diffraction grating patterns having different focal points for simultaneously carrying out recording or reproducing to or from a plurality of tracks of an optical disk.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be explained below with reference to FIGS. 1A to 11B.

(First Embodiment)

Figure 1A:
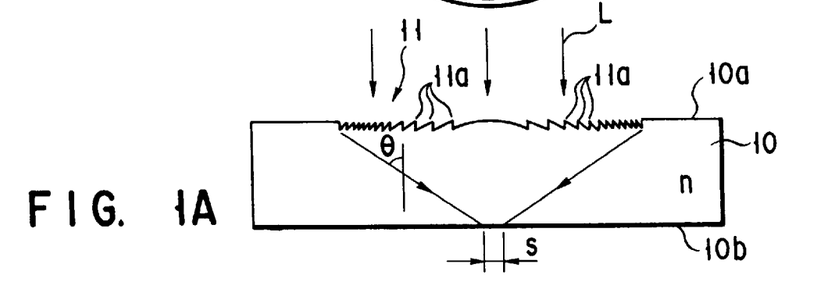
FIGS. 1A and 1B show schematic structures of a diffraction grating lens relating to a first embodiment of the present invention.
Figure 1B:
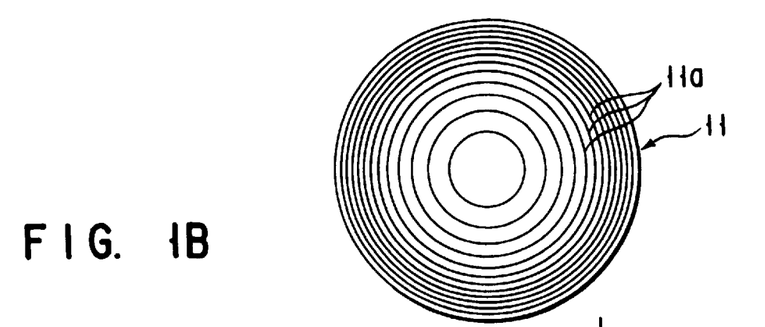

FIG. 1A shows a schematic structure of the diffraction grating lens relating a first embodiment of the present invention, where FIG. 1B is a plan view for showing a diffraction grating pattern formed on this diffraction grating lens.

In FIG. 1A, 10 denotes a light transmissive substrate for constituting a lens main body, with one plane 10a acting as a light beam incident side at the time of focusing a light beam flux and the other plane 10b acting as a focusing side. On the plane 10a of the light transmissive substrate 10, a diffraction grating pattern 11 for acting as a lens is formed. The diffraction grating pattern 11 is constituted by a plurality of diffraction gratings 11a blazed and formed in a non-uniform period concentric shape, and is designed to have a lens action so that an incident light beam L is diffracted and focused on a focal point set on the other plane 10b with a spot diameter s.

Since this lens is for focusing an incident light beam within the light transmissive substrate 10, a numerical aperture NA is given by the following expression $$NA = n \cdot \sin\theta \quad (2)$$

where, n represents a refractive index of the light transmissive substrate 10 and θ represents a diffraction angle. Accordingly, from the above expression (1), a spot diameter s at the focal point becomes as follow.

$$s = c \cdot \lambda/(n \cdot \sin\theta) \quad (3)$$

Then, by setting θ as $$\sin\theta > 1/n \quad (4)$$

the spot diameter s of the expression (3) can be made smaller than a diffraction-limited spot diameter cλ in the air. In other words, when a material having a larger refractive index than that of air, for example, a material of n=1.8, is used for the light transmissive substrate 10, the spot diameter s of the expression (3) can be made smaller than the diffraction-limited spot diameter cλ in the air if θ is set as θ>34°

Therefore, according to the diffraction grating lens of the present invention, the numerical aperture NA can be designed to be larger than 1. In the diffraction grating lens of the present embodiment, the spot diameter s is designed to be smaller than the diffraction-limited spot diameter cλ in the air by suitably setting the diffraction angle θ according to the refractive index n of the light transmissive substrate 10.

Next, an example of the design of the diffraction grating pattern 11 for obtaining a minimum spot s will be explained.

Figure 2:
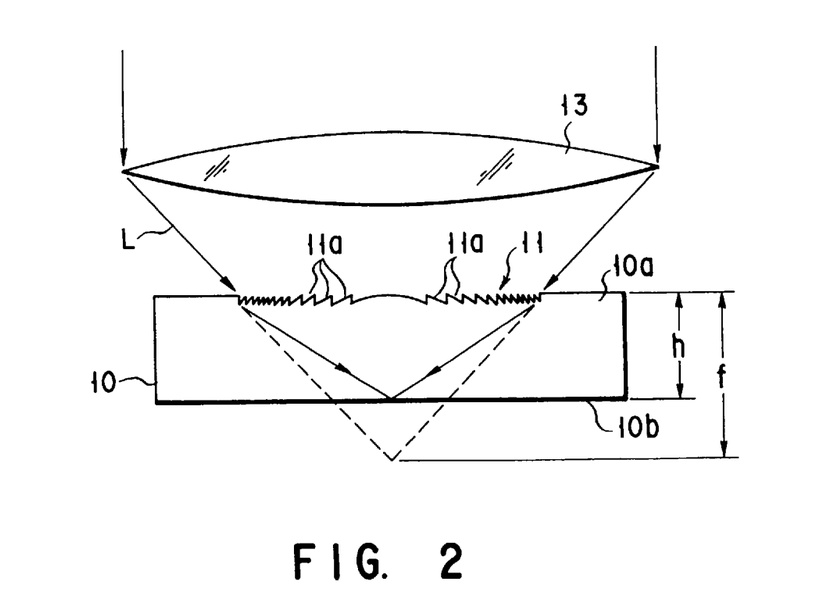
FIG. 2 shows a schematic structure of a diffraction grating lens for the explanation of the grating phase.

At first, an optical system as shown in FIG. 2 will be considered.

FIG. 2 shows an optical system of the case where an incident light beam L is applied to the diffraction grating lens of the present embodiment having a thickness h through a lens 13 so that the light beam is focused at a point of a distance f from the plane 10a of the substrate 10. When it is desired to focus the supplied incident light beam L at a focal point set at the other plane 10b, a grating phase φ of the diffraction grating 11a at a distance r from the center axis of the diffraction grating lens is given by the following expression.

$$\phi = (2\pi/\lambda)\{(n^2h^2+r^2)^{1/2} - (f^2+r^2)^{1/2} - (nh-f)\} \quad (5)$$

In the mean time, the grating phase φ of m-th position from the center is given by the following.

$$\phi = 2\pi m \quad (6)$$

Therefore, the radius r of the m-th diffraction grating 11a from the center is obtained as a value of r which satisfies both expressions (5) and (6).

Accordingly, when the incident light beam L is a parallel light beam as shown in FIG. 1A, that is, when f=∞, the m-th grating radius $r_m$ is given by the following expression.

$$r_m = \{(m\lambda)^2 + 2m\lambda(nh)\}^{1/2} \quad (7)$$

Therefore, when the non-uniform period diffraction grating pattern 11 which follows the expression (7) is formed on the plane 10a of the light transmissive substrate 10 having the thickness h, a diffraction grating lens having the above-described minimum spot diameter can be obtained.

The diffraction grating pattern 11 can be formed easily by using an electron beam drawing or an NC lathe. Further, since the diffraction grating pattern 11 is a concentric pattern, it is possible to directly process the substrate 11 by the NC lathe or to copy the pattern by using a mold.

Further, at the other plane 10a of the diffraction grating lens, an evanescent light-wave having the minimum spot diameter s is obtained. Since this evanescent light-wave is attenuated rapidly in the air, it is necessary to position the object in the vicinity of the other plane 10b of the diffraction grating lens when a light-wave of the minimum spot diameter is utilized.

According to the above-described structure, the numerical aperture NA of the lens is made larger than 1 by forming the diffraction grating pattern 11 on the light transmissive substrate 10 and by focusing the light beam flux within the light transmissive substrate 10. Therefore, it is possible to focus the light beam on the minimum spot without the necessity of shortening the wavelength of the light source. In this case, since the diffraction grating lens can be structured in plane unlike the conventional SIL, the diffraction grating lens can be made compact and the integration with other parts is facilitated.

(Second Embodiment)

A second embodiment of the present invention will be explained next with reference to FIG. 3.

Although blazed diffraction gratings 11a are used so as to obtain a high diffraction efficiency in the above-described first embodiment (FIGS. 1A and 1B), the shape of the diffraction gratings is not limited to this shape. For example, a diffraction grating pattern 21 having binary pattern 21a on the surface of the light transmissive substrate 10 may also be used, as shown in FIG. 3.

The binary diffraction grating pattern 21 can be easily manufactured by a lithographic technique using a mask similar to the LSI manufacturing process, and this is also suitable for mass production.

(Third Embodiment)

A third embodiment of the present invention will be explained next with reference to FIG. 4.

Although a case where the focal point of a diffracted light beam flux is positioned on the other plane 10b of the light transmissive substrate 10 is shown in the above-described first and second embodiments, it is desirable to design the focal point position by taking into account the thickness of the protection layer of the optical disk when this diffraction grating lens is used for the optical disk recording/reproducing apparatus.

Figure 4:
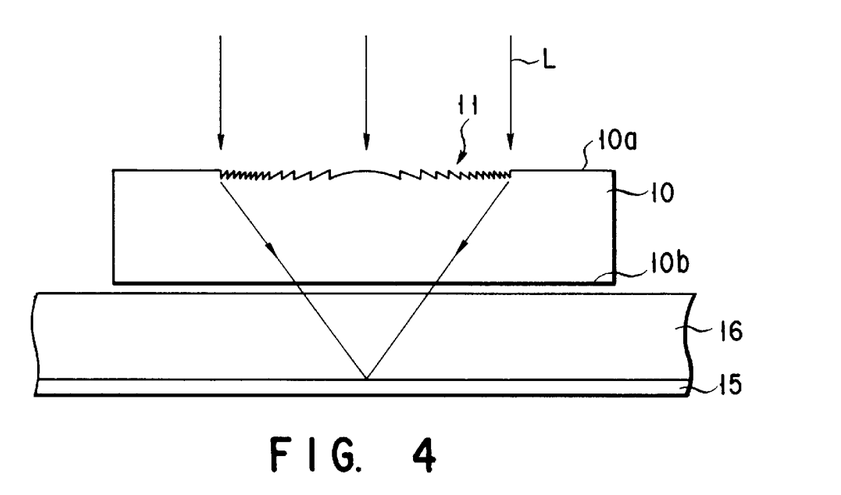
FIG. 4 shows a schematic structure of a diffraction grating lens relating to a third embodiment of the present invention.

To be more specific, when information from the rear side of the disk is to be recorded and reproduced as shown in FIG. 4, the diffraction grating lens is designed by taking into account the thickness of a protection layer 16 covered on the recording surface of a disk 15, in other words, by regarding this protection layer 16 as a part of the light transmissive substrate 10.

FIG. 4 does not always suggest that it is necessary to design the focal point position of the diffraction grating lens by considering the thickness of the protection layer 16 of the optical disk 15. Namely, when the thickness of the protection layer 16 of the optical disk 15 is small, the diffraction grating lens of the first and second embodiments can be also used as it is.

(Fourth Embodiment)

A fourth embodiment of the present invention will be explained next with reference to FIGS. 6A and 6B.

Figure 5:
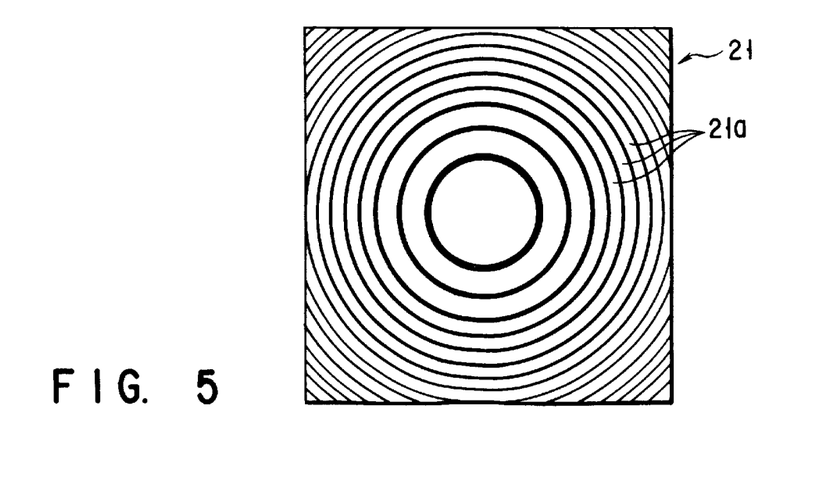
FIG. 5 shows a schematic structure of a diffraction grating lens relating to a fourth embodiment of the present invention.

Although the diffraction grating patterns 11 and 21 are formed in a circular area in the above-described first to third embodiments, these diffraction grating patterns may also be formed within a square area as shown in FIG. 5.

The embodiment shown in FIG. 5 shows a case where a diffraction grating pattern 21 constituted by binary pattern 21a is formed within a square area. The utilization of the diffraction grating pattern 21 in such a square area is a large characteristic of the present invention, which facilitates a high-density integration of the lenses.

Figure 6A:
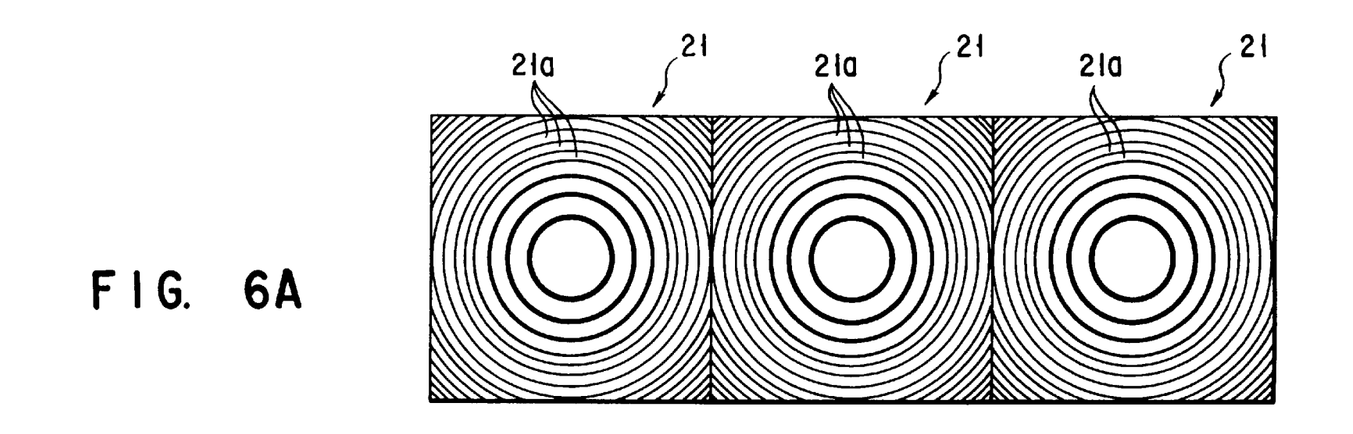
FIGS. 6A and 6B show structures having the diffraction grating lens of the fourth embodiment integrated by a plurality of number.
Figure 6B:
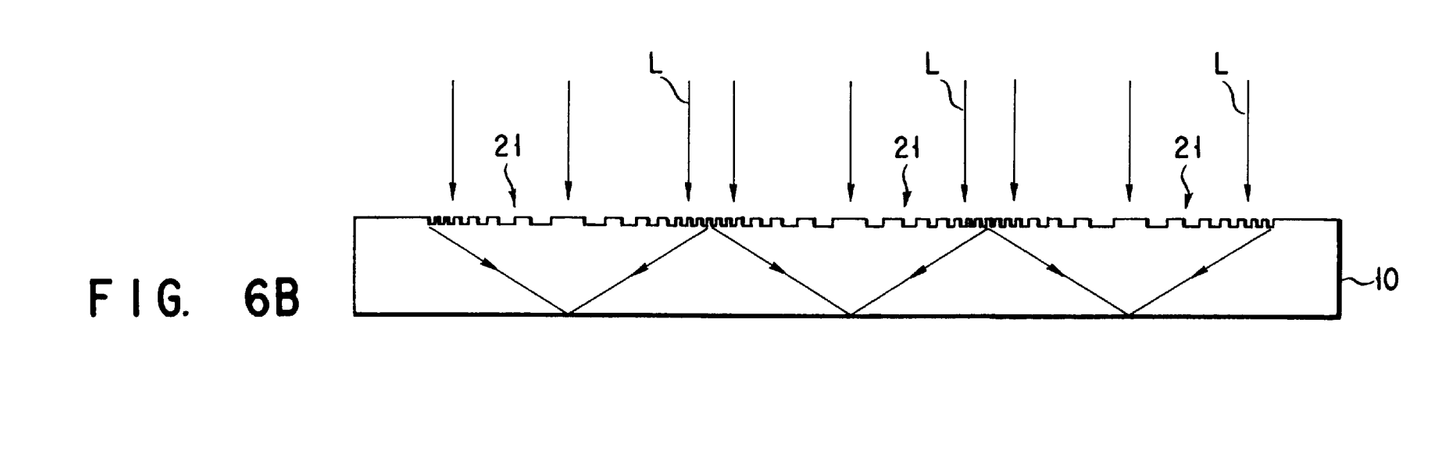

Namely, by integrating the diffraction grating pattern 21 shown in FIG. 5 by three, for example, as shown in FIGS. 6A and 6B, a diffraction grating lens having three different focal point positions can be structured easily.

This kind of diffraction grating lens can be used for the so-called multi-track recording and reproducing for simultaneously carrying out recording or reproduction to or from a plurality of tracks formed on the optical disk.

Further, since the diffraction grating 21a of this diffraction grating lens has binary pattern, this diffraction grating lens can be manufactured easily by the lithographic technique using a mask similar to the LSI manufacturing process.

(Fifth Embodiment)

Figure 7A:
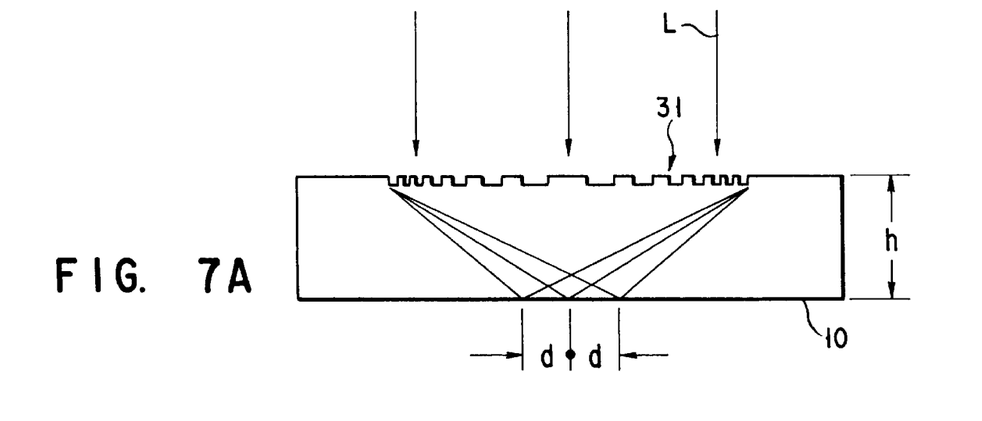
FIGS. 7A and 7B show schematic structures of a diffraction grating lens relating to a fifth embodiment of the present invention.
Figure 7B:
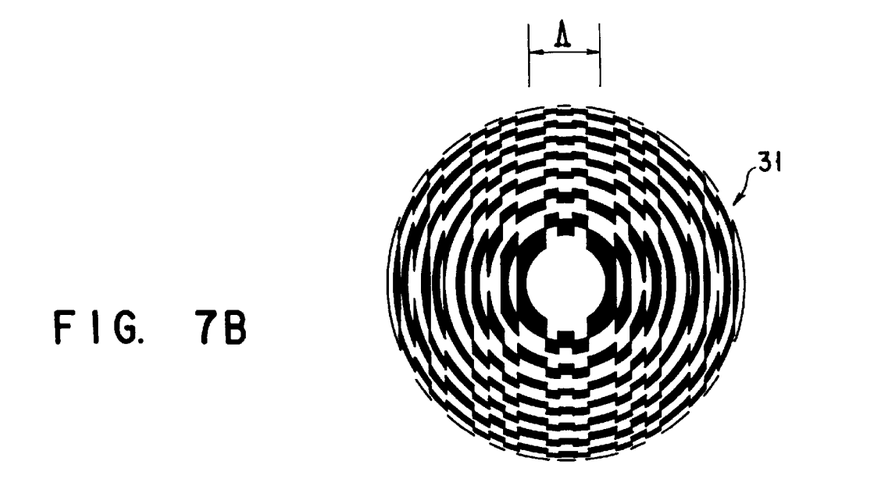

FIG. 7A is a schematic structure diagram for showing a diffraction grating lens relating to a fifth embodiment of the present invention, and FIG. 7B is a plan view for showing a diffraction grating pattern 31 formed on this diffraction grating lens.

Figure 3:
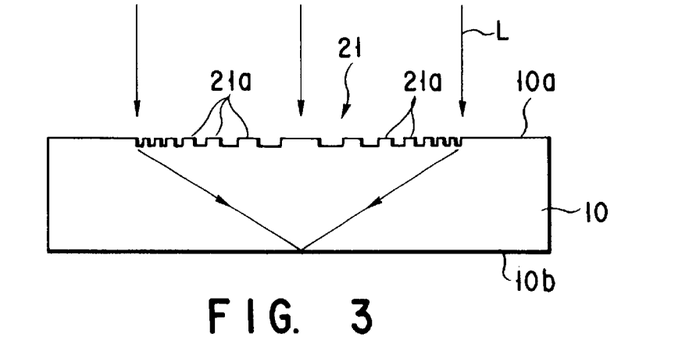
FIG. 3 shows a schematic structure of a diffraction grating lens relating to a second embodiment of the present invention.

The diffraction grating pattern 31 formed on the diffraction grating lens of the embodiment of the present invention is formed by modulating in one direction the phase of the binary diffraction grating pattern 21 shown in FIG. 3 in the period of Λ by using this diffraction grating pattern 21 as the basic pattern. By this arrangement, diffracted beams are focused at a plurality of focal points. The number of the focal points can be changed by a function for modulating the phase.

For example, when a diffraction grating pattern 31 having three focal points as shown in FIG. 7A is formed, a tracking control according to a three-beam method (twin spot method) is made possible where three light beams are used and information is read by the center light beam and tracking is carried out by the two light beams on both sides. In this case, the period Λ of the phase modulation for a distance d of the focal point position is given by the following expression.

$$\Lambda = n\lambda h/d \quad (8)$$

where, λ represents a wavelength and n represents a refractive index of the diffraction grating lens substrate.

Although in the above-described mode of implementation description has been made of the case where the phase modulation is carried out in one dimension, that is the phase modulation is carried only in one direction, it is also possible to carry out the phase modulation in two dimensions so that a lens having a plurality of focal points in two dimensions can be obtained.

(Sixth Embodiment)

A sixth embodiment of the present invention will be explained next with reference to FIGS. 8A and 8B.

According to the diffraction grating lenses of the first to the fifth embodiments, a part of a diffracted light beam is not emitted as a propagational light but is emitted as an evanescent light-wave. Therefore, in order to utilize the minimum spot diameter s, it is important to control the position of an object (the recording surface of an optical disk, for example) so that the object is brought close to the evanescent light-wave where the object can have an interaction with the evanescent light-wave.

When this distance becomes larger, the evanescent light-wave is attenuated rapidly so that only a part of propagational light-wave can reach the disk plane, with a result that a spot diameter not larger than the diffraction-limited spot diameter can not be utilized.

However, not all the light beams emitted from this lens become evanescent light-waves but the light beams that are incident to the points near the center of the lens are emitted directly as propagational light beams. Unlike the evanescent light-waves, these light beams are not attenuated so significantly even if the distance between the disk plane and the lens is set longer.

Accordingly, when focal point positions are tried to be detected by detecting reflected light beams of the evanescent light-waves, the propagational light components may interrupt this detection depending on the distance between the disk plane and the lens.

Figure 8A:
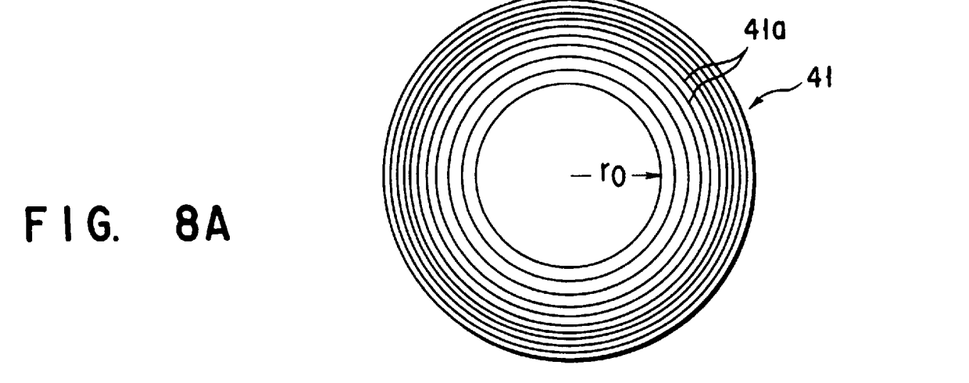
FIGS. 8A and 8B show schematic structures of a diffraction grating lens relating to a sixth embodiment of the present invention.
Figure 8B:
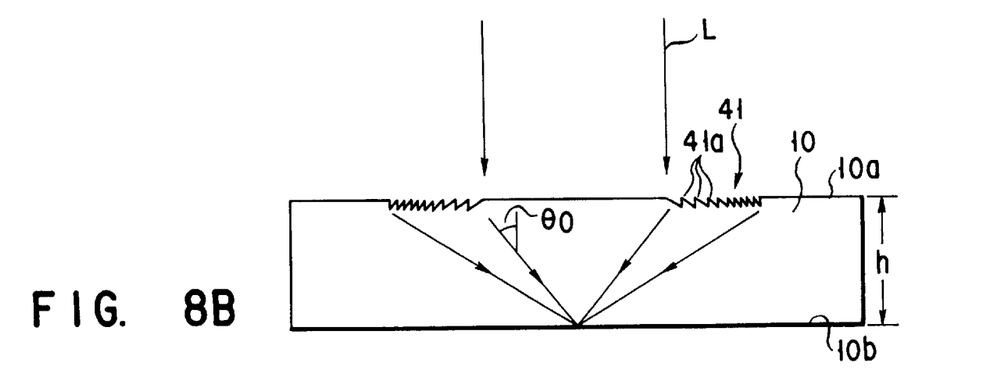

A diffraction grating lens of the present embodiment shown in FIGS. 8A and 8B is designed to eliminate such unnecessary propagational light components, and diffraction gratings 41A of a diffraction grating pattern 41 are formed in only the area where diffracted light beams are totally reflected on the other plane 10b of the light transmissive substrate 10.

The boundary radius r at which the light beams diffracted by the diffraction grating pattern 41 are totally reflected on the other plane 10b of the light transmissive substrate 10 is obtained by the following expression.

$$r_0 = h \cdot \tan \theta_0 \quad (9)$$

$$\sin \theta_0 = 1/n \quad (10)$$

From the expressions (9) and (10), the following expression is obtained.

$$R_0 = h/(n^2-1)^{1/2} \quad (11)$$

Accordingly, the diffraction gratings 41a of the diffraction grating pattern 41 are formed in only the area where r>r₀ and are not formed at points near the center of the lens where r>r₀.

(Seventh Embodiment)

A seventh embodiment of the present invention will be explained below with reference to FIGS. 9 and 10.

Figure 9:
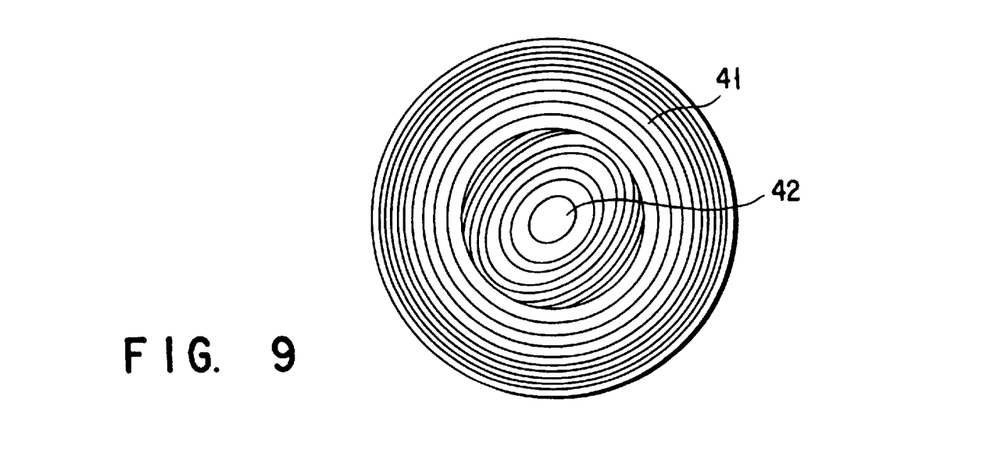
FIG. 9 shows a schematic structure of a diffraction grating lens relating to a seventh embodiment of the present invention.

A diffraction grating lens of the seventh embodiment is one where other diffraction grating pattern 42 for detecting a focal point or tracking is formed in the area where the diffraction gratings 41a of FIGS. 8A and 8B are not formed in the sixth embodiment, as shown in FIG. 9.

According to the present embodiment, the other diffraction grating pattern 42 is formed not in a circular shape but in an elliptical shape so that reflected light beams from the optical disk plane are formed in beams having an astigmatism. With this arrangement, a focal point detection/control becomes possible by the so-called astigmatism method.

Figure 10:
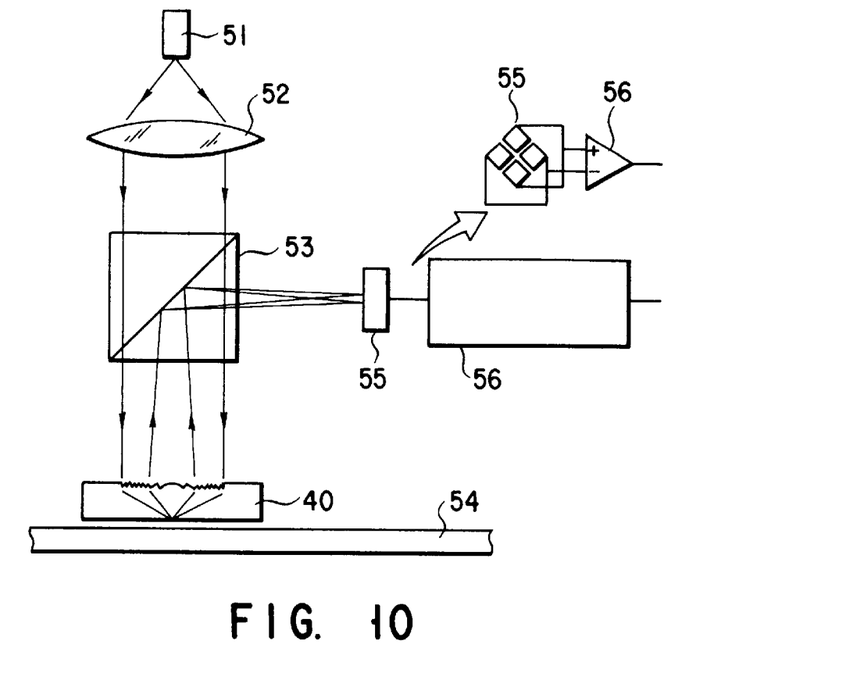
FIG. 10 shows an example of the application of the diffraction grating lens of the seventh embodiment of the present invention.

FIG. 10 shows an example of the case where a diffraction grating lens having the diffraction grating patterns 41 and 42 shown in FIG. 9 is applied for an optical disk recording/reproducing apparatus.

In FIG. 10, a reference number 40 denotes a diffraction grating lens of the present embodiment, 51 a semiconductor laser, 52 a collimation lens, 53 a beam splitter, 54 an optical disk, 55 a four-divided photodetector, and 56 a differential amplifier.

With the above-described structure, when the disk 54 is at a focused position, the shape of a reflected light beam flux from the disk 54 after having passed through the diffraction grating pattern 42 becomes circular on the four-divided photodetector 55, and an error voltage of the output of the differential amplifier becomes 0. When there occurs a focusing deviation, the shape of the return light beam flux becomes oblong and a focusing error voltage is generated. A focusing control can be carried out in this way.

Therefore, with the above-described structure, it becomes possible to omit a cylindrical lens which is essential according to the conventional astigmatism method.

Further, it is also possible to carry out a tracking control based on a detection signal of the four-divided photodetector 55.

The focal point detection method is not limited to the astigmatism method shown in FIG. 10 but a diffraction grating pattern can be designed corresponding to various methods. In any case, it is one of the large characteristics of the present invention to be able to form diffraction grating patterns having at least two kinds of different lens actions on one substrate.

(Eighth Embodiment)

Although the astigmatism diffraction grating pattern different from the focusing diffraction grating pattern is formed in the area of $r<r_0$ in the seventh embodiment, the formation is not limited to the area of $r<r_0$.

Figure 11A:
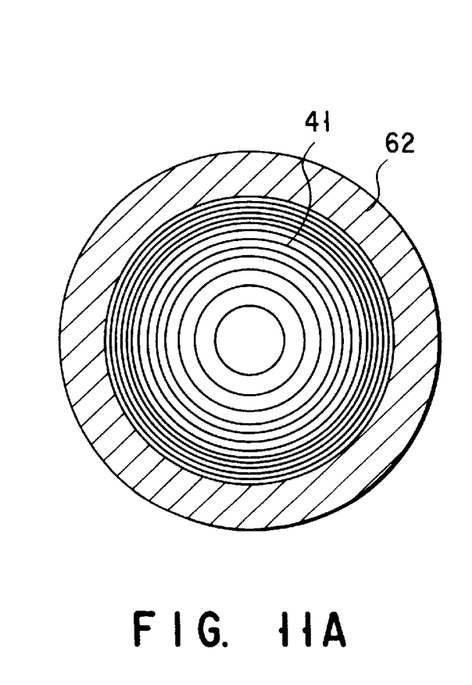
FIGS. 11A and 11B show schematic structures of a diffraction grating lens relating to an eighth embodiment of the present invention.
Figure 11B:
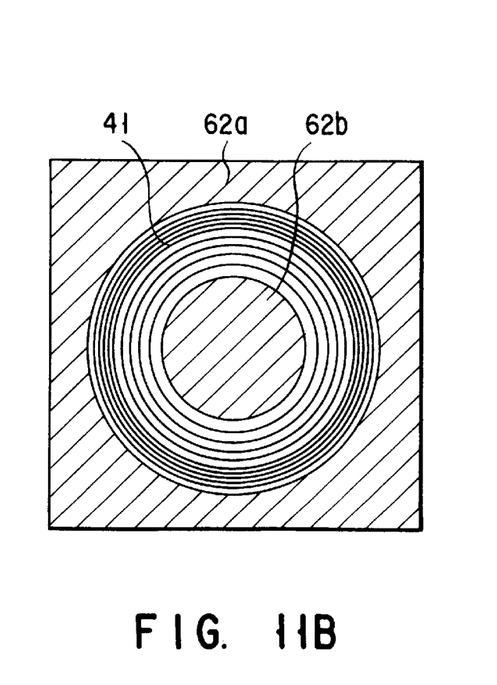

More specifically, the astigmatism diffraction grating pattern may also be provided in an area 62 indicated by many dots outside the pattern 41 of the focusing diffraction grating lens as shown in FIG. 11A, or the astigmatism diffraction grating pattern may be provided in both inside and outside areas 62a and 62b respectively as shown in FIG. 11B.

It is needless to mention that the present invention is not limited to the above-described first to the eighth embodiments but can be modified in various forms without changing the point of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A diffraction grating lens, comprising:

a light transmissive substrate having a refractive index larger than 1 and a light incident surface and an opposite facing surface; and a diffraction grating pattern having a lens effect formed as a plurality of diffraction gratings on said light incident surface of said light transmissive substrate, wherein said diffraction grating pattern having a lens effect focuses an incident light beam flux received on said light incident surface at at least one focal point in a direction of said opposite facing surface of said light transmissive substrate so that a lens numerical aperture, calculated with said at least one focal point as a peak point, becomes larger than 1.

2. A diffraction grating lens according to claim 1, wherein said plurality of diffraction gratings of said diffraction grating pattern are formed in a non-uniform period concentric shape.

3. A diffraction grating lens according to claim 2, wherein there is provided an area where a diffraction grating is not formed at the center of said diffraction grating pattern.

4. A diffraction grating lens according to claim 1, wherein said diffraction gratings of said diffraction grating pattern are formed in only an area on said light incident surface so that light beams diffracted by said diffraction gratings are totally reflected on said opposite facing surface of said light transmissive substrate.

5. A diffraction grating lens according to claim 1, wherein said diffraction grating pattern is one of a plurality of diffraction grating patterns each having different focal points.

6. A diffraction grating lens according to claim 1, wherein said diffraction grating pattern has its phase periodically modulated so as to have a plurality of focal points.

7. A diffraction grating lens, comprising:

a light transmissive substrate with a refractive index larger than 1, said light transmissive substrate having a light incident surface and an opposite facing surface; and first and second diffraction grating patterns each having a lens effect and each formed as a plurality of diffraction gratings on said light incident surface of said light transmissive substrate, wherein said first diffraction grating pattern having a lens effect focuses an incident light beam flux received on said light incident surface at a focal point in a direction of said opposite facing surface of said light transmissive substrate so that a lens numerical aperture, calculated with said focal point as a peak point, becomes larger than 1, and said second diffraction grating pattern is provided on a part of said first grating pattern and has a lens action different from that of said first diffraction grating pattern.

8. A diffraction grating lens according to claim 7, wherein said plurality of diffraction gratings of said first diffraction grating pattern are formed in a non-uniform period concentric shape.

9. A diffraction grating lens according to claim 7, wherein said diffraction gratings of said first diffraction grating pattern are formed in only an area on said light incident surface so that light beams diffracted by said diffraction gratings of said first diffraction pattern are totally reflected on said opposite facing surface of said light transmissive substrate.

10. A diffraction grating lens according to claim 7, wherein
said diffraction gratings of said second diffraction grating pattern are formed in elliptical shapes.

11. A diffraction grating lens, comprising:
a light transmissive substrate with a refractive index larger than 1, said light transmissive substrate having a light incident surface and an opposite facing surface; and
a plurality of diffraction grating patterns each having a lens effect and each formed as a plurality of diffraction gratings on said light incident surface of said light transmissive substrate, wherein
each of said diffraction grating patterns having a lens effect focuses an incident light beam flux received on said light incident surface at a different focal point at a different position in a direction of said opposite facing surface of said light transmissive substrate and is formed so that each has a lens numerical aperture, calculated with said different focal point as a peak point, that becomes larger than 1.

12. A diffraction grating lens according to claim 11, wherein
said plurality of diffraction gratings of said diffraction grating pattern are formed in a non-uniform period concentric shape.

13. A diffraction grating lens according to claim 11, wherein
said diffraction gratings of at least one of said diffraction grating patterns are formed in only an area on said light incident surface so that light beams diffracted by said diffraction gratings of said first diffraction pattern are totally reflected on said opposite facing surface of said light transmissive substrate.

14. A diffraction grating lens according to claim 11, wherein
said plurality of diffraction grating patterns are provided to be mutually adjacent to each other.

15. A diffraction grating lens according to claim 11, wherein
said plurality of diffraction grating patterns are provided to be mutually superposed with each other.

16. An optical disk recording/reproducing apparatus having an objective lens disposed to face an optical disk for carrying out recording and reproducing of information by irradiating a light beam to said optical disk through said objective lens and detecting a light beam reflected from said optical disk, wherein said objective lens comprises:
a light transmissive substrate having a refractive index larger than 1 and a light incident surface and an opposite facing surface; and
a diffraction grating pattern having a lens effect formed as a plurality of diffraction gratings on said light incident surface of said light transmissive substrate, wherein
said diffraction grating pattern having a lens effect focuses an incident light beam flux received on said light incident surface at at least one focal point in a direction of said opposite facing surface of said light transmissive substrate so that a lens numerical aperture, calculated with said at least one focal point as a peak point, becomes larger than 1.

17. An optical disk recording/reproducing apparatus according to claim 16, wherein
said plurality of diffraction gratings of said diffraction grating pattern are formed in a non-uniform period concentric shape.

18. An optical disk recording/reproducing apparatus according to claim 17, wherein
there is provided an area where a diffraction grating is not formed at the center of said diffraction grating pattern.

19. An optical disk recording/reproducing apparatus according to claim 18, wherein
said diffraction gratings of said diffraction grating pattern are formed in only an area on said light incident surface so that light beams diffracted by said diffraction gratings are totally reflected on said opposite facing surface of said light transmissive substrate.

20. An optical disk recording/reproducing apparatus according to claim 18, wherein
a diffraction grating pattern having a different lens effect is formed on a part of said light transmissive substrate, and
said diffraction grating pattern having the different lens effect is used for detecting the focus for drive controlling the objective lens.

21. An optical disk recording/reproducing apparatus according to claim 20, wherein
said diffraction grating pattern having said different lens effect is formed in an elliptical shape so that a light beam irradiated to and reflected from a disk through this diffraction grating pattern has an astigmatism.

22. An optical disk recording/reproducing apparatus according to claim 18, wherein
said diffraction grating pattern includes a plurality of diffraction grating patterns having different focal points for simultaneously carrying out recording or reproducing to or from a plurality of tracks of an optical disk.

23. A diffraction grating lens according to claim 1, wherein said diffraction grating pattern focuses an incident light beam flux at said at least one focal point inside the light transmissive substrate and emits a light beam including an evanescent light wave from the opposite facing surface of the light transmissive substrate.

24. An optical disk recording/reproducing apparatus according to claim 16 wherein
said diffraction grating pattern of the objective lens focuses an incident light beam flux at said at least one focal point inside the light transmissive substrate and emits a light beam including an evanescent light wave from the opposite facing surface of the light transmissive substrate.

* * * * *